United States Patent
Boswell et al.

(10) Patent No.: US 10,456,835 B2
(45) Date of Patent: Oct. 29, 2019

(54) METHOD OF ATTACHING A PROJECTION TO A THIN WALLED COMPONENT

(71) Applicants: ROLLS-ROYCE plc, London (GB); TWI LIMITED, Cambridge (GB)

(72) Inventors: John H Boswell, Derby (GB); Jeffrey Allen, Derby (GB); Carl Hauser, Rotherham (GB); Neil Preece, Rotherham (GB)

(73) Assignees: ROLLS-ROYCE plc, London (GB); TWI LIMITED, Cambridge (GB)

( * ) Notice: Subject to any disclaimer, the term of this patent is extended or adjusted under 35 U.S.C. 154(b) by 119 days.

(21) Appl. No.: 15/695,650

(22) Filed: Sep. 5, 2017

(65) Prior Publication Data
US 2018/0065185 A1 Mar. 8, 2018

(30) Foreign Application Priority Data
Sep. 7, 2016 (GB) .................. 1615164.9

(51) Int. Cl.
*B22F 3/105* (2006.01)
*B22F 5/00* (2006.01)
(Continued)

(52) U.S. Cl.
CPC .............. *B22F 5/009* (2013.01); *B22F 3/115* (2013.01); *B22F 3/24* (2013.01); *B23P 15/00* (2013.01);
(Continued)

(58) Field of Classification Search
CPC .. B22F 5/009; B22F 3/115; B22F 3/24; B22F 2003/248; B22F 2003/1058; F01D 25/243;
(Continued)

(56) References Cited

U.S. PATENT DOCUMENTS

| 4,152,568 A | 5/1979 | Yamaguchi et al. |
| 4,360,141 A | 11/1982 | Kensrue |

(Continued)

FOREIGN PATENT DOCUMENTS

| CN | 204603602 U | 9/2015 |
| DE | 10 2011 108957 A1 | 1/2013 |

(Continued)

OTHER PUBLICATIONS

Jan. 24, 2018 Search Report issued in European Patent Application No. 17189265.

(Continued)

*Primary Examiner* — Jun S Yoo
(74) *Attorney, Agent, or Firm* — Oliff PLC

(57) ABSTRACT

A method of attaching a projection to a thin walled component, the thin walled component having a first surface and an opposite second surface, the method comprises the steps of:

(i) providing a thin walled component;
(ii) identifying a first position on the first surface of the thin walled component;
(iii) building a hollow thin walled lattice structure on the second surface at a second position using a liquid metal deposition process, the second position corresponding to the first position; and
(iv) building a projection on the first surface at the first position using a liquid metal deposition process.

13 Claims, 2 Drawing Sheets

(51) Int. Cl.
  *B22F 3/115* (2006.01)
  *B22F 3/24* (2006.01)
  *F01D 25/24* (2006.01)
  *B23P 15/00* (2006.01)
  *B22F 7/08* (2006.01)

(52) U.S. Cl.
  CPC ............ *F01D 25/24* (2013.01); *F01D 25/243* (2013.01); *B22F 7/08* (2013.01); *B22F 2003/1058* (2013.01); *B22F 2003/248* (2013.01); *B22F 2999/00* (2013.01); *F05D 2230/30* (2013.01); *Y02T 50/671* (2013.01)

(58) Field of Classification Search
  CPC ........ F01D 25/24; B23P 15/00; Y02T 50/671; F05D 2230/30
  See application file for complete search history.

(56) References Cited

U.S. PATENT DOCUMENTS

| | | | |
|---|---|---|---|
| 4,801,070 A | 1/1989 | Hom et al. | |
| 2002/0020164 A1* | 2/2002 | Cleveland | B21C 37/06 60/39.01 |
| 2003/0047587 A1* | 3/2003 | Aono | B23K 20/1265 228/112.1 |
| 2006/0009691 A1 | 1/2006 | Yeo et al. | |
| 2008/0086882 A1 | 4/2008 | Eleftheriou et al. | |
| 2008/0199344 A1 | 8/2008 | Chau et al. | |
| 2009/0086007 A1 | 4/2009 | Chen | |
| 2011/0072660 A1 | 3/2011 | Flesch et al. | |
| 2012/0125523 A1* | 5/2012 | Dupre | B23P 6/005 156/98 |
| 2013/0189086 A1* | 7/2013 | Bayer | F01D 25/00 415/173.1 |
| 2015/0167498 A1* | 6/2015 | Todorovic | F01D 21/045 415/214.1 |
| 2016/0221264 A1* | 8/2016 | Doherty | B33Y 10/00 |
| 2016/0229127 A1 | 8/2016 | Halliday et al. | |
| 2016/0281986 A1* | 9/2016 | Chang | F23R 3/06 |

FOREIGN PATENT DOCUMENTS

| | | |
|---|---|---|
| EP | 2472070 A2 | 7/2012 |
| EP | 2884057 A1 | 6/2015 |
| EP | 3061561 A1 | 8/2016 |
| FR | 2 959 434 A1 | 11/2011 |
| GB | 2442238 A | 4/2008 |
| WO | 00/44525 A1 | 8/2000 |
| WO | 2013/171589 A2 | 11/2013 |

OTHER PUBLICATIONS

Feb. 28, 2017 Search Report issued in British Patent Application No. GB1615164.9.

* cited by examiner

METHOD OF ATTACHING A PROJECTION TO A THIN WALLED COMPONENT

This disclosure claims the benefit of UK Patent Application No. 1615164.9, filed on 7 Sep. 2016, which is hereby incorporated herein in its entirety.

FIELD OF THE DISCLOSURE

The present disclosure relates to a method of attaching a projection to a thin walled component and particularly, but not exclusively, to a method of attaching a projection to a gas turbine engine casing.

BACKGROUND TO THE DISCLOSURE

The term thin walled component is well known and is understood to mean a structure in which a thickness of a wall of the structure is small in comparison to other dimensions (length, width, diameter, etc.) of the component.

A gas turbine engine casing is conventionally manufactured from a single piece forging. This manufacturing technique often results in the finished component having a Buy-to-Fly ratio of around 10. In other words, the weight of the raw forging can be approximately 10 times that of the finished machined casing.

The requirement to add projections to either the inner surface or the outer surface of the engine casing can significantly increase the Buy-to-Fly ratio because considerably more material must be added to the raw forging than will be required for the finished projection itself.

Adding such features using conventional welding techniques may result in high levels of distortion in the thin walled component. While it might be possible to prevent this distortion by increasing the section of the thin walled component this would result in a finished component of greater mass and therefore lower weight efficiency.

Alternatively, the whole of the thin walled component might be pre-heated to minimise distortion. This would require a significant amount of heat energy together with an enclosure sufficiently large to accommodate the thin walled component.

Statements of Disclosure

According to a first aspect of the present disclosure there is provided a method of attaching a projection to a thin walled component, the thin walled component having a first surface and an opposite second surface, the method comprising the steps of:
(i) providing a thin walled component;
(ii) identifying a first position on the first surface of the thin walled component;
(iii) building a hollow thin walled lattice structure on the second surface at a second position using a liquid metal deposition process, the second position corresponding to the first position; and
(iv) building a projection on the first surface at the first position using a liquid metal deposition process.

The building of a lattice thin walled lattice structure on one side of the thin walled component will significantly increase the local structural rigidity of the thin walled component.

The use of a liquid metal deposition process to build a projection on a second opposite side of the thin walled component minimises the quantity of heat energy added to the material of the thin walled component. This in combination with the increased local structural rigidity of the thin walled component considerably reduces any thermal distortion of the thin walled component by the addition of the projection.

Optionally, the method comprises the further step of:
(v) removing the hollow thin walled lattice structure from the second surface.

In one arrangement of the disclosure, the thin walled lattice structure is removed after the projection has been built. This results in the thin walled component together with the attached projection, without the need to machine away excess material to achieve this resulting finished component. This makes the arrangement both cost and time efficient compared to prior art alternatives.

The lattice structure may be removed by any suitable material removal technique such as, for example, electro-deposition machining. Any such technique must not remove material corresponding to the wall of the thin walled component.

In another arrangement of the disclosure, the thin walled lattice structure is retained, where the volume occupied by the lattice structure is not required for another purpose. This can results in a local increase of the structural rigidity of the thin walled component, which, in turn, may allow the size of the projection to be reduced so further increasing the weight efficiency of the thin walled component.

Optionally, the method comprises the further step of:
(vi) heat treating the thin walled component to relieve residual stresses resulting from the addition of the projection.

The use of heat treatment to relieve residual stresses resulting from the addition of the projection may further improve the dimensional stability of the thin walled component.

Optionally, the hollow thin walled lattice structure comprises a plurality of elongate cells, each of the cells having an axis that extends substantially normally to the second surface.

The thin walled lattice structure is built up from the second surface of the thin walled component to form an arrangement of adjoining cells.

In one arrangement, the cells have a hexagonal cross-sectional shape to provide for an efficient space-filling arrangement. A hexagonal cross-section for the cells provides the most efficient shape in terms of strength and weight.

In other arrangements, the cells may have other cross-sectional shapes such as, for example, square, diamond or triangular, that also provide for a space-filling arrangement.

Optionally, each of the cells has a wall thickness of between 0.5 mm and 1.0 mm.

This minimises the quantity of material required to build the lattice structure so making the method more time and cost efficient.

Optionally, method step (iv), comprises the concurrent step of:
(iv-a) during the building of the projection, directing a cooling fluid over the hollow thin walled lattice structure to impinge upon the second surface of the thin walled component.

The cooling of the thin walled component by the directed flow of a cooling fluid impinging against the second surface of the hollow lattice structure may reduce any distortion of the thin walled component resulting from the heat input from the liquid metal deposition process.

Optionally, method step (iv), comprises the concurrent step of:

(iv-a') during the building of the projection, directing a heating fluid over the hollow thin walled lattice structure to impinge upon the second surface of the thin walled component.

In an alternative arrangement, a heating fluid is directed onto the second surface of the hollow lattice structure to thereby offset the effect on the dimensional stability of the thin walled component caused by the heat input from the liquid metal deposition process.

Optionally, method step (iii) comprises the further step of:
(iii-a) filling the hollow thin walled lattice structure with a filler material.

As an alternative to the directed flow of a heating fluid impinging against the second surface of the thin walled component, the hollow thin walled lattice structure may be filled with a filler material.

The use of a filler material to fill the cells of the lattice structure will increase the structural rigidity of the lattice structure by increasing the buckling limit of the lattice cell walls.

The addition of the filler material will reduce the thermal energy transfer from the second surface through the lattice structure. This in turn may reduce the thermal gradient in the projection as it is built onto the first surface of the thin walled component.

Optionally, the filler material is selected from the group consisting of ceramic slurry and ceramic foam.

Ceramic slurry and ceramic foam materials may be readily added to the cell voids of the lattice structure, and provide the increases in structural rigidity and insulation that are discussed above.

Optionally, the projection is selected from the group consisting of boss, tube, flange, bracket and stub.

The projection may be any form of three-dimensional geometrical feature, such as a boss, a tube, a flange, a bracket or a stub.

According to a second aspect of the present disclosure there is provided an article comprising a thin walled component having a projection attached thereto by the method according to the first aspect.

The method of the disclosure is applicable to the addition of any three-dimensional feature to a generic thin walled component. Examples of such component include pressure vessels, tanks, etc.

According to a third aspect of the present disclosure there is provided a gas turbine engine casing comprising a thin walled component having a projection attached thereto by the method according to the first aspect.

A gas turbine engine comprises an engine casing in the form of thin walled component as hereinbefore defined and discussed.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
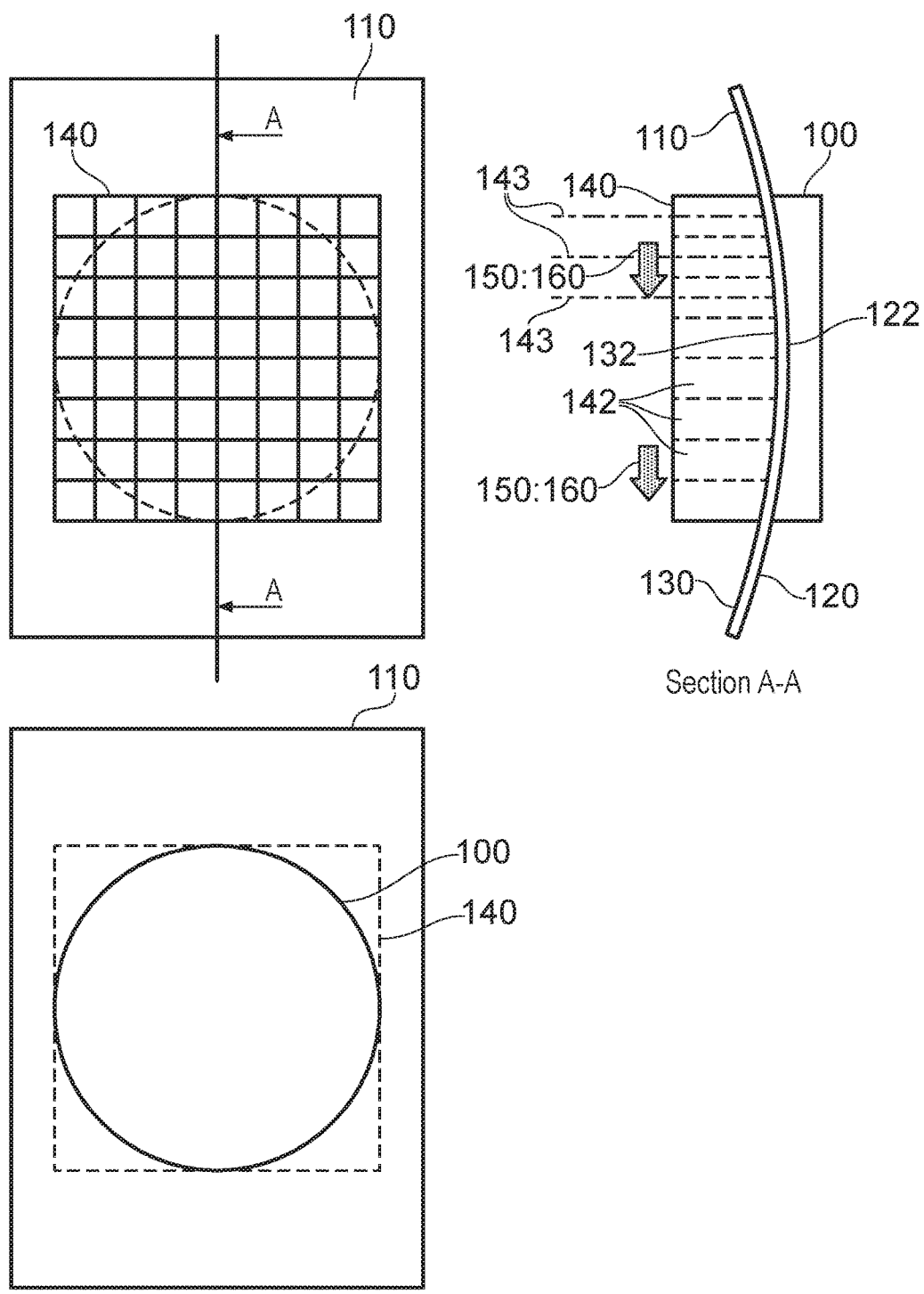
FIG. 1 shows a schematic plan and elevational views of a thin walled component with attached lattice structure and projection according to an embodiment of the disclosure.
Figure 2:
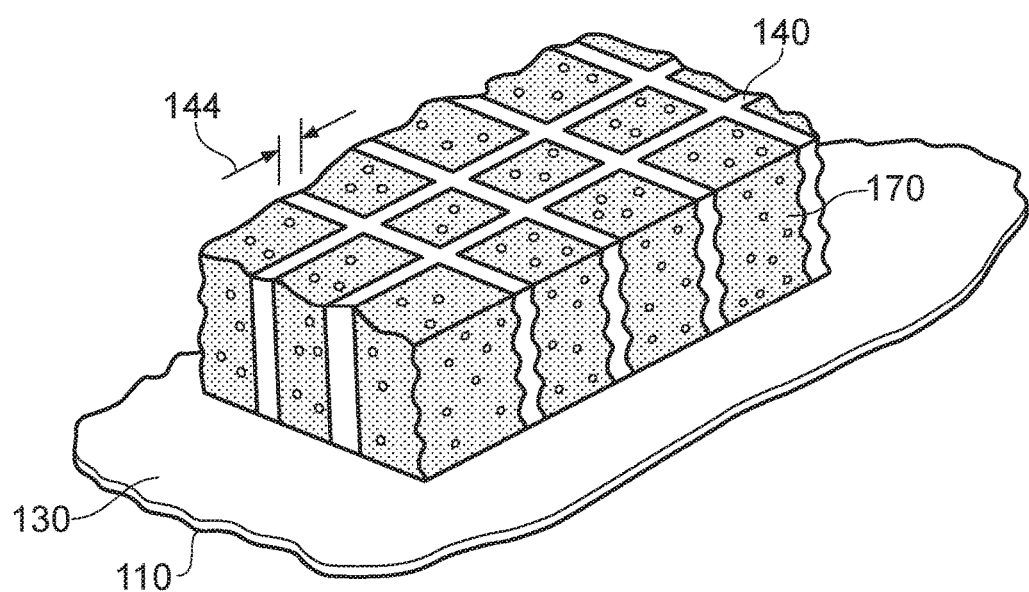
FIG. 2 shows a schematic perspective view of a portion of the lattice structure of the component of FIG. 1 showing the addition of a filler material.

Referring to FIGS. 1 and 2, a thin walled component according to a first embodiment of the disclosure is designated generally by the reference numeral 110.

The thin walled component 110 has a first surface 120 and an opposite second surface 130.

A first position 122 is identified on the first surface 120. Identification of the first position 122 is provided by the desired location of the projection 100 that is to be attached to the thin walled component 110.

A second position 132 is identified on the second surface 130. The second position 132 corresponds to the first position 122. In other words, the first position 122 and the second position 132 are coincident with one another on opposing surfaces 120,130 of the thin walled component.

A hollow thin walled lattice structure 140 is built onto the second surface 130 of the thin walled component 110, at the second position 132. In other words, the lattice structure 140 is centred on the second position 132.

The lattice structure is built using a liquid metal deposition process. Any suitable liquid metal deposition process may be used such as, for example, a blown powder technique or a wire feed technique. Such techniques are well known and will not be discussed further herein.

The area of the second surface 130 that is covered by the lattice structure 140 will be determined by the cross-sectional area of the projection 100 that is to be built onto the first surface 120 of the thin walled component. Generally, the lattice structure 140 will cover a surface area that is larger than that of the projection 100.

The size and shape of the area of the second surface that is covered by the lattice structure 140 may be determined empirically, or may be determined by known computational analysis techniques.

The lattice structure 140 comprises a plurality of individual elongate cells 142. The cells 142 are built such that their axis 142 extends substantially normally from the second surface 130. Each of the cells 142 has a wall thickness 144 of 0.8 mm.

In the arrangement shown in FIGS. 1 and 2, the cells 142 have a hexagonal cross-sectional shape (not shown). This enables the individual cells 142 to most effectively fill the area covered by the lattice structure 140.

The individual cells 142 are then filled with a filler material 170 in the form of a ceramic slurry. This filler material 170 enhances the structural rigidity and the thermal insulative properties of the lattice structure 140.

Once the lattice structure 140 has been built onto the second surface 130 of the thin walled component 110, the projection 100 can be built onto the first surface 120 of the thin walled component 110. The projection 100 is also built using a liquid metal deposition process as outlined above for the lattice structure 140.

During the process of building the projection 100 onto the first surface 120 of the thin walled component 110, a heating fluid 160 is circulated over the lattice structure 140. The circulation of the heating fluid 160 across the lattice structure 140 offsets the thermal effect of the heat input from the liquid metal deposition process that is used to build the projection 100.

In the embodiment shown in FIGS. 1 and 2, the projection 100 takes the form of a boss 100.

Figure 3:
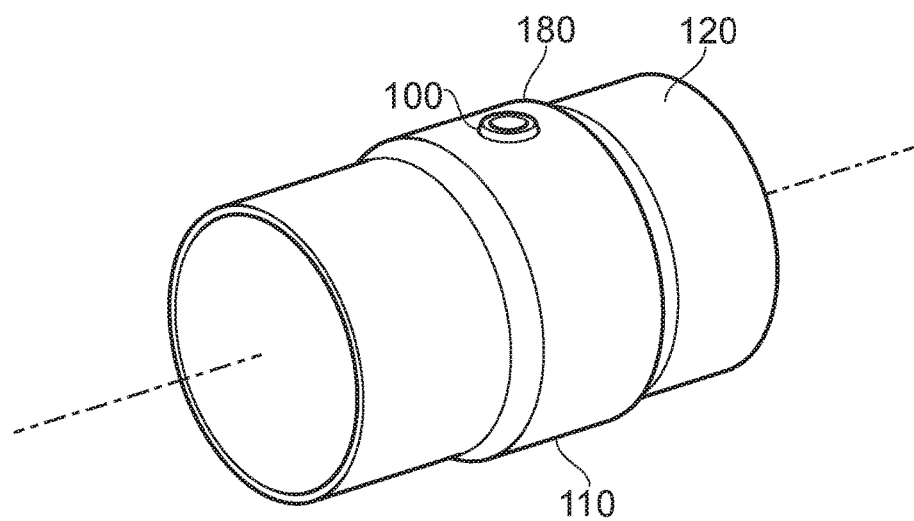
FIG. 3 shows a schematic perspective view of a gas engine casing according to a third aspect of the disclosure.

FIG. 3 shows a gas turbine engine casing 180 in the form of a thin walled component 110 having an attached projection 100, with the projection having been attached by the method of the present disclosure.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method of attaching a projection to a thin walled component, the thin walled component having a first surface and an opposite second surface, the method comprising the steps of:
   (i) providing a thin walled component;
   (ii) identifying a first position on the first surface of the thin walled component;
   (iii) identifying a second position on the second surface, wherein the first position and the second position are coincident with one another on the first surface and the second surface of the thin walled component;
   (iv) building a hollow thin walled lattice structure on the second surface at the second position using a liquid metal deposition process, the lattice structure being centered on the second position; and
   (v) building a projection on the first surface at the first position using a liquid metal deposition process, wherein steps (i)-(v) are sequentially performed.

2. The method as claimed in claim 1, wherein the method comprises the further step of:
   (vi) removing the hollow thin walled lattice structure from the second surface.

3. The method as claimed in claim 1, wherein the method comprises the further step of:
   (vii) heat treating the thin walled component to relieve residual stresses resulting from the addition of the projection.

4. The method as claimed in claim 1, wherein the hollow thin walled lattice structure comprises a plurality of elongate cells, each of the cells having an axis that extends substantially normally to the second surface.

5. The method as claimed in claim 4, wherein each of the cells has a wall thickness of between 0.5 mm and 1.0 mm.

6. The method as claimed in claim 1, wherein step (v) comprises the concurrent step of:
   (v-a) during the building of the projection, directing a cooling fluid over the hollow thin walled lattice structure to impinge upon the second surface of the thin walled component.

7. The method as claimed in claim 1, wherein step (v) comprises the concurrent step of:
   (v-a') during the building of the projection, directing a heating fluid over the hollow thin walled lattice structure to impinge upon the second surface of the thin walled component.

8. The method as claimed in claim 1, wherein step (iv) comprises the further step of:
   (iv-a) filling the hollow thin walled lattice structure with a filler material.

9. The method as claimed in claim 8, wherein the filler material is selected from the group consisting of ceramic slurry and ceramic foam.

10. The method as claimed in claim 1, wherein the projection is selected from the group consisting of boss, tube, flange, bracket and stub.

11. An article comprising a thin walled component having a projection attached thereto by the method as claimed in claim 1.

12. A gas turbine engine casing comprising a thin walled component having a projection attached thereto by the method as claimed in claim 1.

13. The method as claimed in claim 1, wherein an area of the second surface that is covered by the lattice structure is determined by a cross-sectional area of the projection that is to be built onto the first surface of the thin walled component.

* * * * *